United States Patent [19]
Edele et al.

[11] Patent Number: 5,987,695
[45] Date of Patent: Nov. 23, 1999

[54] CONNECTING LINK FOR A WIPER SYSTEM, IN PARTICULAR ON A MOTOR VEHICLE

[75] Inventors: Reinhard Edele; Oldrich Krizek, both of Bietigheim-Bissingen; Eckhardt Schmid, Brackenheim, all of Germany

[73] Assignee: ITT Manufacturing Enterprises, Inc., Wilmington, Del.

[21] Appl. No.: 08/849,921

[22] PCT Filed: Oct. 17, 1995

[86] PCT No.: PCT/EP95/04070

§ 371 Date: Aug. 14, 1997

§ 102(e) Date: Aug. 14, 1997

[87] PCT Pub. No.: WO96/19367

PCT Pub. Date: Jun. 27, 1996

[30] Foreign Application Priority Data

Dec. 20, 1994 [DE] Germany .............................. 44 45 417

[51] Int. Cl.⁶ ................................. B60S 1/46; B60S 1/40; B60S 1/34
[52] U.S. Cl. ..................................... 15/250.04; 15/250.32; 15/250.23
[58] Field of Search ............................ 15/250.23, 250.32, 15/250.31, 250.3, 250.04, 250.351

[56] References Cited

U.S. PATENT DOCUMENTS

| | | | |
|---|---|---|---|
| 3,076,991 | 2/1963 | Macpherson | 15/250.23 |
| 4,621,389 | 11/1986 | Grave | 15/250.32 |
| 4,716,612 | 1/1988 | D'Alba | 15/250.23 |
| 4,791,696 | 12/1988 | Durtnal | 15/250.23 |
| 4,967,438 | 11/1990 | Arai et al. | 15/250.32 |
| 5,016,312 | 5/1991 | Frimley | 15/250.32 |
| 5,245,720 | 9/1993 | Schon | 15/250.32 |
| 5,327,614 | 7/1994 | Egner-Walter et al. | 15/250.04 |

FOREIGN PATENT DOCUMENTS

| | | | |
|---|---|---|---|
| 1109312 | 9/1955 | France | 15/250.23 |
| 1283741 | 2/1962 | France | 15/250.32 |
| 33 40 449 | 5/1985 | Germany . | |
| 3907980 | 9/1990 | Germany | 15/250.04 |
| 39 17 483 | 12/1990 | Germany . | |
| 2088706 | 6/1982 | United Kingdom | 15/250.23 |

Primary Examiner—Gary K. Graham
Attorney, Agent, or Firm—J. Gordon Lewis

[57] ABSTRACT

In order to configure a connecting link for articulated connecting with a wiper arm and with a control arm so that it can be connected in a dependable manner with little effort to the widely used type of wiper blade, in which an attachment bolt extends transverse to the longitudinal direction of the wiper blade in an upward open region between the two side cheeks of the wiper blade support bar, which stand apart from each other and run parallel to each other; the connecting link has a one-piece base element with a back part and a connecting part set at a distance from it in the direction of the pane to be wiped, said connecting part is designed to snap into the attachment bolt of the wiper blade support bar, and at the back part there are mutually spaced connecting elements, in particular articulated bolts attached to pivot the wiper arm and the control arm.

14 Claims, 3 Drawing Sheets

CONNECTING LINK FOR A WIPER SYSTEM, IN PARTICULAR ON A MOTOR VEHICLE

BACKGROUND OF THE INVENTION

The invention pertains to a connecting link for a wiper system, in particular on a motor vehicle, to which the free end of a wiper arm attached to a wiper shaft driven back and forth and the free end of a control arm attached on a rotating axis are articulated at a distance from each other and with which a wiper blade is connected and can pivot in the direction toward the pane to be wiped.

Wiper systems for motor vehicles are known in which the wiper blade is moved back and forth essentially parallel to the pane itself and along the pane being wiped. In wiper systems of this kind, in addition to a wiper arm attached to a wiper shaft movable in pendulum fashion, there is a so-called control arm on a chassis-mounted, rotating axis. The free end of the wiper arm and the free end of the control arm are articulated with a coupling element, such that the two articulation points are kept at a distance from each other. The control arm can be aligned roughly parallel to the wiper arm, so that the coupling element completes a deformable parallelogram with the wiper arm and the control arm. It is also possible that the control arm intersects the wiper arm. The wiper blade belonging to the wiper system is attached pivotably at the coupling element about an axis running transverse to the longitudinal direction of the wiper blade.

From published German patent application No. 3,917,483 a connecting link of this kind is known, whose base element is designed as a single piece of sheet metal by punching and bending. From one back of the connecting link there are two side cheeks curved downward, that is, in the direction of the pane to be wiped, so that these side cheeks run at a distance from each other and parallel to each other. This region of the connecting element with the downward curved side cheeks thus forms a kind of closing clasp, and the wiper blade support bar is located between said side cheeks. The pivoting mount of the wiper blade at the connecting link is by means of a special threaded bolt which is extended through aligned holes in the side cheeks of the closing clasp and into the side cheeks of the wiper blade support bar and is secured with a nut.

This known connecting link has the significant disadvantage that it can only be used in connection with the specific wiper blades that have the necessary drill holes in the side walls of the wiper blade support bar. In addition, the threaded bolt that holds the wiper blade to pivot on the connecting link is exposed to large stresses. Therefore, the threaded bolt must be made of high quality material with corresponding strength, which results in correspondingly high costs. Another problem is that a necessary replacement of the wiper blade proves to be relatively cumbersome, and that the connecting link of sheet metal under current conditions does not exactly offer a pleasing sight. Finally, the latent possibility of injury during manual activities in the vicinity of the relatively sharp-edge connecting link must be pointed out.

From published German patent application No. 1,405,995 another connecting link of this kind of wiper system is known. As its base, this connecting link has a carrier manufactured from pressed synthetic resin. There are two articulated bolts attached to this carrier plate, which forms the back of the connecting link, and between the two articulated bolts there is a downward pointing closing clasp screwed on. Under certain circumstances, this connecting link does not have such a sharp edge, and thus the disadvantages of the connecting link attributable to the sharp edges from published German patent application No. 3,917,483 are not a factor. However, the other described features also apply to this connecting link.

SUMMARY OF THE INVENTION

The purpose of the invention is to refine a connecting link of the kind described above, so that it can be connected with little effort, in a functionally dependable manner with the widely used type of wiper blade, and in which an attachment bolt is attached in an open region of the wiper blade support bar transverse to the longitudinal direction of the wiper blade, in which the side cheeks of the wiper blade support bar run parallel to and apart from each other at a certain distance.

According to the invention, the problem is solved by a connecting link with a connecting line that has a single-piece base element with a back part and with a connecting part for the wiper blade, said connecting part standing apart from the back part in the direction of the pane to be wiped, wherein at the back part there is a connecting element, in particular an articulated bolt, for articulation of the wiper arm and a connecting element, in particular an articulated bolt, to pivot the control arm and wherein the connecting part is designed to snap into an attachment bolt extending between two parallel side walls at the wiper blade support bar. Because the connecting part of the one-piece base element of the connecting link is designed to snap into the mounting bolt extending between the parallel side cheeks of the wiper blade support bar, the achieved advantage is that now a wiper blade of this widely-used type can be used on a wiper system with a connecting link between a wiper arm and a control arm. Thus, the specially designed wiper blades designed for these wiper systems can now be omitted. In addition, there is the advantage that replacement of the wiper blade is much simpler compared to the type previously known, and nonetheless, the full functional reliability of the wiper is assured. When using a connecting link of the kind according to this invention, it is possible to reduce the number of different types of wiper blades, which also has advantages with regard to transport and storage of wiper blades.

Due to a formation of parallel side walls of the connecting part, a good lateral control of the wiper blade support bar is attained, since relatively large surfaces are available for lateral control. Due to a placement of a downward open snap-in holder for the attachment bolts of the wiper blade support bar transversely between its side cheeks, the side walls do not need to have a snap-in function of any kind, thus they have merely a static function for the connecting link and the function of the lateral control of the wiper blade. A satisfactory snap-in function of the connecting part will thus be assured in that the downward open snap-in holder is formed by two mutually opposing snap-in springs, that extend downward between the two side walls emanating from the back part and are equipped with corresponding, opposing snap-in lugs. These snap-in springs move freely between the two side walls. The downward open recesses installed in the region of the snap-in holder in the side walls reduce the control surface of the side walls only slightly, so that in spite of this interruption, a satisfactory control of the wiper blade at the connecting part is assured. In this case, an embodiment is preferred, wherein the upper edges of the recesses in the side walls are intended to rest against the attachment bolt of the wiper blade support bar.

These two contact points have the greatest possible distance from each other, so that the control of the wiper blade at the connecting part of the connecting link will thus be further improved. In order not to place excessive demands on the manufacturing accuracy of the wiper blades that are used, it is an advantage to provide laterally spaced control strips or spring sections at the outside of the side walls of the connecting part of the connecting link. Due to this action, a tolerance-conditional, lateral play between the connecting part and the support bar of the wiper blade can be compensated, so that even under these circumstances, a satisfactory lateral control of the support bar at the side walls of the connecting part is assured.

Another important advantage results from an embodiment wherein the articulated bolt is a cylinder bolt for pivoting of the wiper arm at the connecting link, and the articulated bolt to pivot the control arm is a ball-end pin. Due to this action, mechanical stresses in the pivoting system of wiper arm, control arm and connecting link are avoided; these are produced in this system when the geometric axes of the wiper shaft and the rotation axis, on which the control arm is attached, are not aligned exactly parallel to each other. The required exact control of the connecting link is thus assured through the embodiment of the articulated pin for pivoting of the wiper arm as a cylinder pin. By means of an embodiment of the connecting link wherein the connecting part is located at the edge of the back part and the cylindrical articulated bolt for the wiper arm is attached approximately centrally via this connecting part in the back part, the exact control of the connecting link at the wiper arm will be additionally improved, since no lateral offset occurs between the articulation point of the wiper arm at the connecting link and the articulation point of the wiper plate at the connecting link.

A stable attachment of the articulated bolt will then be achieved when the articulated bolts have a base section with which they are attached in the back part of the connecting link. This attachment is particularly simple and low in cost when the articulated bolts are cast or injected with their base part as an insertion part in the base element. In this case an embodiment is preferred, wherein the articulated bolts are surrounded by a socket at the base part; said socket stands upward apart from the back part. This embodiment makes possible high stability of the connection between base element and articulated bolt with the smallest possible consumption of material. Then, if in addition, this socket is of cylindrical shape, it is possible to equip it with a ring bulge or a ring groove, which, in turn, cooperates with a corresponding counter piece of the articulated part necessarily provided on wiper arm or control arm as a seal for the formed pivot bearing. This embodiment can also be used to snap in the articulated part attached to the wiper arm or to the control arm with the cylindrical socket, so that no additional axial retainer is needed, but so that nonetheless, a rotary motion is possible between the two parts. Thus, the assembly effort can be even further reduced.

An embodiment is preferred, in which the edge of the back part is curved downward, at least in sections, and reinforcing ribs are provided on the underside of the back part. Thus, the necessary mechanical stability of the base element or of the connecting link will be assured with relatively little consumption of material, and in addition, it is possible to configure a pleasing external presentation of the connecting link. Since the curved edge and the reinforcing ribs point in the direction of the pane to be cleaned, they are not visible to an observer from the outside. In addition, the reinforcing ribs and the surrounding edge cannot have an adverse effect on the incident air flow on the wiper device.

The manufacture of a connecting link is particularly low in cost if at the back part of the connecting link, in particular at its underside, there is a housing for the spray device for the output of washing fluid onto the pane being wiped, wherein a one-piece, molded housing is particularly preferred. This housing can be complemented by corresponding spray nozzles. It is recommended to install a spray ball in an appropriately configured holding opening. Said spray ball allows adjustment of the direction of the spray jet due to its spatial pivot ability. It is even better to form a spray opening, in particular a broad jet spray opening, directly in the wall of the housing immediately during the manufacture of the base element of the connecting link. The connecting link, or at least the base element, and, if desired, also the housing can be made of a suitable metal or metal alloy for an injection device as a single-piece cast part, in particular, a pressure cast part. It is even better to manufacture this structure as a single injection molded part from a suitable, shape-stable synthetic material.

One application example of the invention will be described in greater detail below based on the figures.

BRIEF DESCRIPTION OF THE DRAWINGS

Shown are.

DETAILED DESCRIPTION OF THE DRAWINGS

Figure 1:
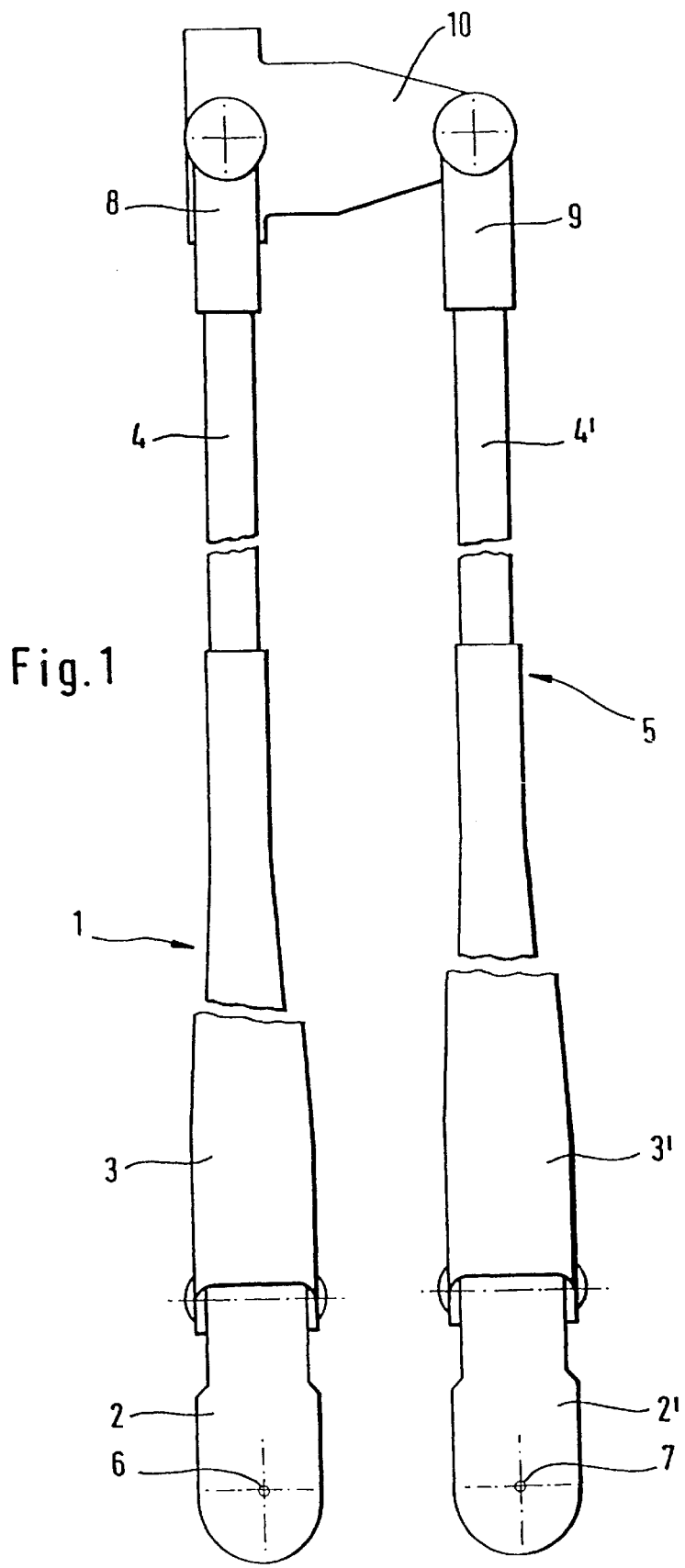
FIG. 1—a system consisting of wiper arm, control arm and connecting link.

In FIG. 1, reference number 1 is a wiper arm of a wiper system, which consists in a known manner of an attachment part 2 and an articulated part 3 pivot-mounted to the attachment part 2, wherein a wiper rod 4 is securely attached to the articulated part 3. The control arm as a whole is denoted by reference number 5 and has a embodiment similar to that of the wiper arm 1. It consists of an attachment part 2', an articulated part 3' pivot-mounted to the attachment part 2', to which the control rod 4' is attached. The wiper arm 1 is attached to a wiper shaft that can be driven in pendulum fashion about its rotational axis 6. The wiper shaft itself is not visible in FIG. 1. Its axis of rotation 6 runs perpendicular to the plane of the drawing. The control arm 5 is attached to a rotational shaft that is also not visible in FIG. 1 and whose axis of rotation 7 likewise runs perpendicular to the plane of the drawing. At the free end of the wiper arm 1 there is an articulated part 8 at the straight wiper rod 4 for making a pivot connection of the wiper arm 1 with the connecting link 10. The control arm 5 is located at a distance to the side of the wiper arm 1, and on its free end, the straight control rod 4' likewise has an articulated part 9 for making a pivot connection of the control arm 5 with the connecting link 10. The system shown in FIG. 1 consisting of wiper arm 1, control arm 5 and connecting link 10 forms a parallelogram that changes its shape during operation of the wiper system. The connecting link 10 thus retains essentially its horizontal alignment, so that a wiper blade (not illustrated in the drawing) attached to the connecting link 10 will be pivoted essentially parallel to itself.

Figure 2:
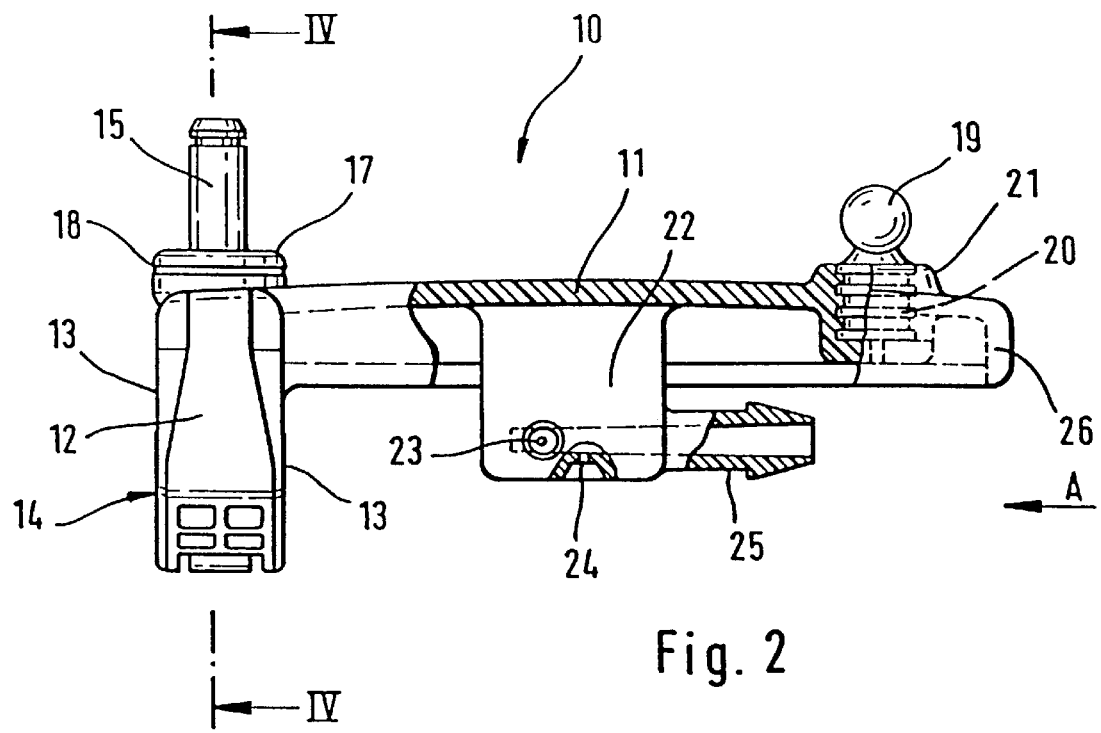
FIG. 2—a side view of the connecting link, shown in partial cut away representation.
Figure 3:
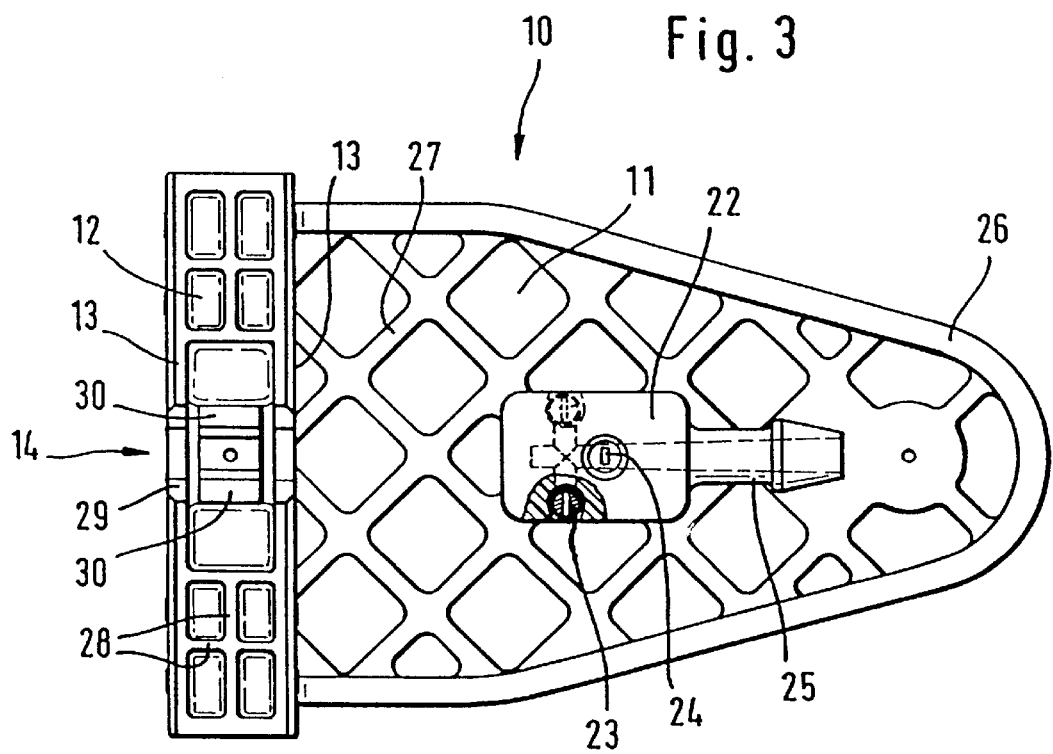
FIG. 3—a view of the connecting link from FIG. 2, seen from below.

Details of the connecting link are visible in FIGS. 2–5. FIG. 2 shows that the connecting link 10 has a base element that consists essentially of a back part 11 and a connecting part 12 for linkage with a wiper blade. The connecting part 12 stands apart from the back part 11 in the direction of the pane to be wiped, wherein within the framework of this application, the direction along the pane to be wiped is designated as "down." The connecting part 12 has two side walls 13 directed parallel to each other and located at a distance from each other. Between these side walls there is a downward open, transverse-running holder 14 for the attachment bolt of the wiper blade.

Figure 4:
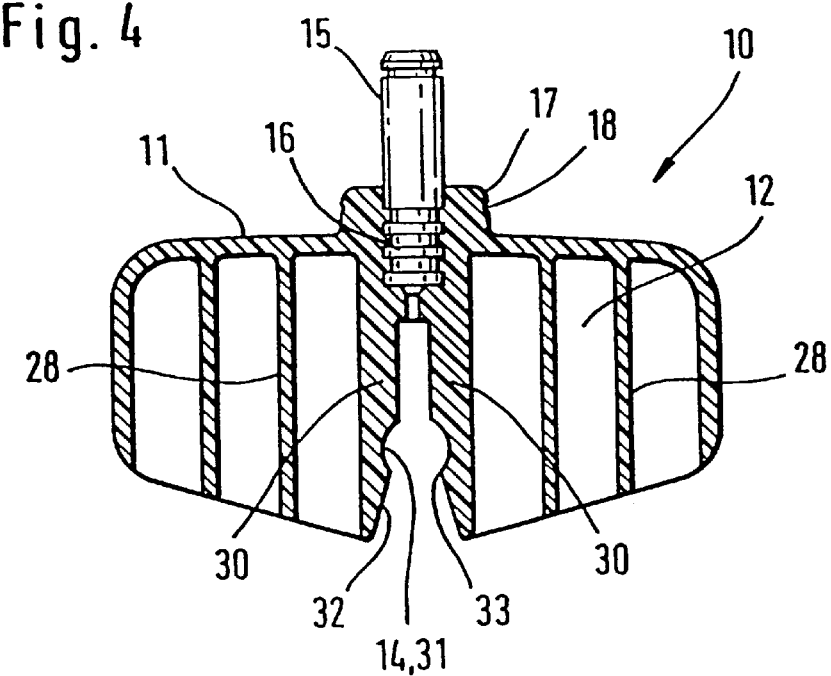
FIG. 4—a cross section along line IV—IV in FIG. 2.

The connecting part 12 in the present application example, with reference to FIG. 2, is molded onto the outer, left edge of the back part 11. In the middle above the connecting part 12, the base part 16 of a cylindrical articulated bolt 15 is attached in the back 11 of the connecting link 10 (FIG. 4). At its base part 16, the articulated bolt 5 is surrounded by a cylindrical socket 17, which has a ring bulge or a ring groove 18. The ring bulge or the ring groove 18 is designed so that, in cooperation with a corresponding counter piece at the articulated part 8 of the wiper arm 1 (FIG. 1), it seals the cylindrical bearing surface of the articulated bolt 15 against environmental factors.

In the vicinity of the right edge of the back part 11 in FIG. 2, a ball-end pin is provided as articulated bolt 19 for articulated connection of the connecting link 10 with the control arm 5. The ball-end pin has a base part 20 that is used to connect it to the back part and is surrounded by a socket 21.

At a distance between the two articulated bolts 15,19, molded onto the underside of the back part 11, there is a housing 22 for a spray device to output the washing fluid onto the pane to be cleaned. This housing 22 has receptacle openings in which a spray ball 23 known in the art can pivot. A broad beam nozzle opening 24 is molded directed in the lower wall of the housing 22. The housing 22 also has a connecting pipe 25 molded on for connection of a washing fluid line (not illustrated).

Finally, in FIG. 2 it is also evident that the edge 26 of the back part 11 is curved downward, at least in sections. From the illustration in FIG. 3 it is evident how the connecting part 12 is located on the left edge of the back part 11. The downward curved edge 26 extends around the entire back part, except for the left side, to which the connecting part 12 is attached. At the underside of the back part 11, in addition to the housing 22 for the spray device, there are a number of mutually intersecting reinforcing ribs 27 that ensure a high stability of the connecting link 10. It is also evident that, in the region of the connecting part 12 between its parallel side walls 13, there are several stabilization walls 28 located in the longitudinal and transverse directions. In the region of the holder 14 for the attachment bolt of the wiper blade, the downward, open-edge recesses 29 in the side walls 13 are visible. The two flexible tongues 30, which extend between the side walls 13 and emanate from the back part 11, are not in connection with the side walls 13. Thus, their free elastic deflection lengthwise will be assured.

The specific embodiment of the flexible tongues 30 is particularly evident in FIG. 4. It is evident that the flexible tongues 30, located at a distance from each other and running parallel to each other, are molded as a single piece to the back part 11 of the base element and extend from there out to the height of the lower edge of the side walls 13. At a certain distance from the lower edge, there are circular-shaped recesses 31 located opposite the flexible tongues 30; the recesses are adapted to the diameter of the attachment bolt of the wiper blade. A run-up ramp 32 extends from the circular recesses 31 to the lower edge of the flexible tongues, so that a snap-in projection 33 is formed for each flexible tongue 30. The holder 14 is thus designed as a downward open snap-in holder.

Figure 5:
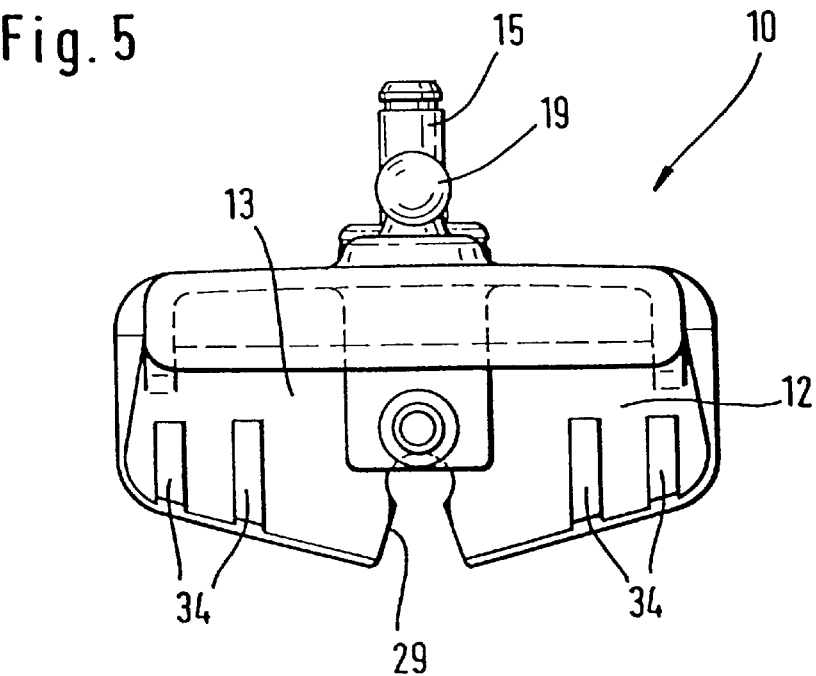
FIG. 5—a view of the connecting link of FIG. 2, seen in the direction of arrow A.

FIG. 5 shows that the downward, open-edge recesses 29 in the side walls 13 of the connecting part 12 are adapted essentially to the shape of the snap-in holder 14,31,33. The upper edge of the recesses is thus a circular arc shape so that it acts as a support for the attachment bolt of the wiper blade. The most narrow location of the recesses 29 is still wide enough so that the attachment bolt of the wiper blade can be pressed through this location. In addition, at the visible side wall 13 of the connecting part 12 in FIG. 5, four additional, vertically running elastic sections 34 are visible that stand apart to the side from the side wall 13. The side wall 13 located to the rear, which is not visible in FIG. 5, is equipped in the same manner. The elastic sections 34 rest against the insides of the parallel side cheeks of the support bar when the wiper blade is assembled, and ensure a compensation of any lateral play possibly present between the side cheeks of the support bar and the side walls 13 of the connecting part 12.

The articulated bolts 15 and 19 are to be attached in known manner known in the art to the articulated parts 8 and 9 of the wiper arm or of the control arm; this process requires no detailed explanation. To connect a wiper blade to the connecting link 10, the connecting part 12 is installed from above into the top-open region of the wiper blade support bar, so that the side walls 13 of the connecting part 12 move between the parallel side cheeks of the wiper blade support bar and the attachment bolt of the support bar is inserted between the two opposing run up ramps 32 of the flexible tongues 30. Thus, the run-up ramps 32 slide along the perimeter of the attachment bolt and the flexible tongues 30 are spread apart because they are elastic, spring-like parts. Once the end position is reached in which the upper edges of the recesses 29 rest in the side walls 13 on the perimeter of the attachment bolt, then the snap-in projections 33 at the flexible tongues 30 are overcome so that the circular-shaped recesses 31 come to rest against the perimeter of the attachment bolt. The snap-in projections 33 ensure a sufficient retention of the wiper blade against the connecting link.

We claim:

1. A connecting link for a wiper system, to which a free end of a wiper arm attached to a wiper shaft driven back and forth and a free end of a control arm attached on a rotating axis are articulated at a distance from each other and with which a wiper blade is connected and adapted to pivot in a direction toward a pane to be wiped, wherein the connecting link has a single-piece base element with a back part and with a connecting part for the wiper blade, said connecting part standing apart from the back part in the direction of the pane to be wiped, wherein at the back part there is an articulated bolt for articulation of the wiper arm and an articulated bolt to pivot the control arm, at least one element of a group comprising the articulated bolt to pivot the wiper arm and the articulated bolt to pivot the control arm being surrounded at its base part by a socket standing apart from the back, the socket being of cylindrical shape and having at its perimeter a ring-shaped means to cooperate with a correspondingly designed opposing element of an articulated part attached at the end of at least one of the pivoted arms, the articulated part being adapted to pivot at the articulated bolt, and wherein the connecting part is designed to snap into an attachment bolt extending between two parallel side walls at a wiper blade support bar.

2. The connecting link according to claim 1, wherein the connecting part for the wiper blade has two parallel side walls extending in the longitudinal direction of the wiper blade support bar, said side walls are designed for lateral control at parallel side cheeks of the wiper blade support bar, between which a mounting bolt extends, and that the connecting part has a snap-in holder that opens downward, that is, in the direction of the pane to be wiped and is transverse to its sidewalls, for the attachment bolt of the wiper blade support bar.

3. The connecting link according to claim 2, wherein between the side walls of the connecting part there are two snap-in springs extending from the back part with opposing snap-in projections, said snap-in springs extending downward and forming the snap-in holder, and that in a region of the downward open snap-in holder there are recesses in the side walls of an appropriate size opening downward at the edge.

4. The connecting link according to claim 3, wherein upper edges of the recesses in the side walls are adapted to rest against the attachment bolt of the wiper blade support bar.

5. The connecting link according to claim 2, wherein the side walls of the connecting part have lateral protruding elastic sections.

6. The connecting link according to claim 1, wherein the articulated bolt for pivoting the wiper arm is a cylinder bolt arm and the articulated bolt to pivot the control arm is a ball-end pin and that both articulated bolts attached by a base section in the back part of the connecting link are cast preferably as an insertion part surrounded by the material of the base element.

7. The connecting link according to claim 1, wherein the connecting part is located at one edge of the back part and the articulated bolt to pivot the wiper arm is located at least approximately centrally above the connecting part.

8. The connecting link according to claim 1, wherein the back part comprises an outer edge, the outer edge surrounding the back part at least in sections downward in the direction of the pane to be wiped, and the back part has an underside with reinforcing ribs.

9. The connecting link according to claim 1, wherein there is a molded-on, one-part housing at the back part for a spray device to output a washing fluid onto the pane to be cleaned.

10. The connecting link according to claim 9, wherein in one wall of the housing there is a spherical receptacle opening for a spray device, and a spray ball is adapted to pivot in said opening.

11. The connecting link according to claim 9, wherein there is a spray opening for the washing fluid, in particular a broad-stream spray opening, molded directly in one wall of the housing for a spray device.

12. The connecting link according to claim 1, wherein at least the base element is manufactured as a single piece cast unit.

13. The connecting link according to claim 12, wherein at least the base element and a housing for the spray device are manufactured as a single piece cast unit.

14. The connecting link according to claim 12, wherein the single piece cast unit is manufactured as a single part injection cast part from shape-stable synthetic material.

* * * * *